June 8, 1954　　　C. H. JORGENSEN　　　2,680,262
VARIABLE SPEED WINDSHIELD WIPER
Filed Jan. 23, 1951

INVENTOR.
Clarence H. Jorgensen
BY
Willits Hardman & Fehr
his attorneys

Patented June 8, 1954

2,680,262

UNITED STATES PATENT OFFICE 2,680,262

VARIABLE SPEED WINDSHIELD WIPER

Clarence H. Jorgensen, East Rochester, N. Y., assignor to General Motors Corporation, Detroit, Mich., a corporation of Delaware Application January 23, 1951, Serial No. 207,373

15 Claims. (Cl. 15—253)

This invention relates to windshield wipers such as are used in automotive vehicles, for example and one object of the invention is to provide a simple, efficient and inexpensive hydraulic mechanism for operating the wiper blades by fluid under pressure supplied by a motor driven pump and for controlling the speed of operation of the blades as desired without a corresponding change in the speed of operation of the pump.

A further feature of the invention consists in the provision of means whereby the same motor is connected to operate the fuel pump for supplying fuel to the engine and a second pump for supplying fluid under pressure for operating the wiper blades.

A still further feature of the invention is the provision of a control valve for regulating the speed of operation of the wiper blade, which is operated by the fluid pump, but the effect of which is controlled by a manually operable member which may be set in different positions to control the wiper speed.

A still further feature of the invention is the provision of means to move the wiper blades to a position outside the normal operating range of such blades when the device is not in operation, but is prevented from moving the blades to this position when the blades are in operation.

Further objects and advantages of the present invention will be apparent from the following description, reference being had to the accompanying drawings wherein a preferred embodiment of the present invention is clearly shown.

Figures 1, 2:
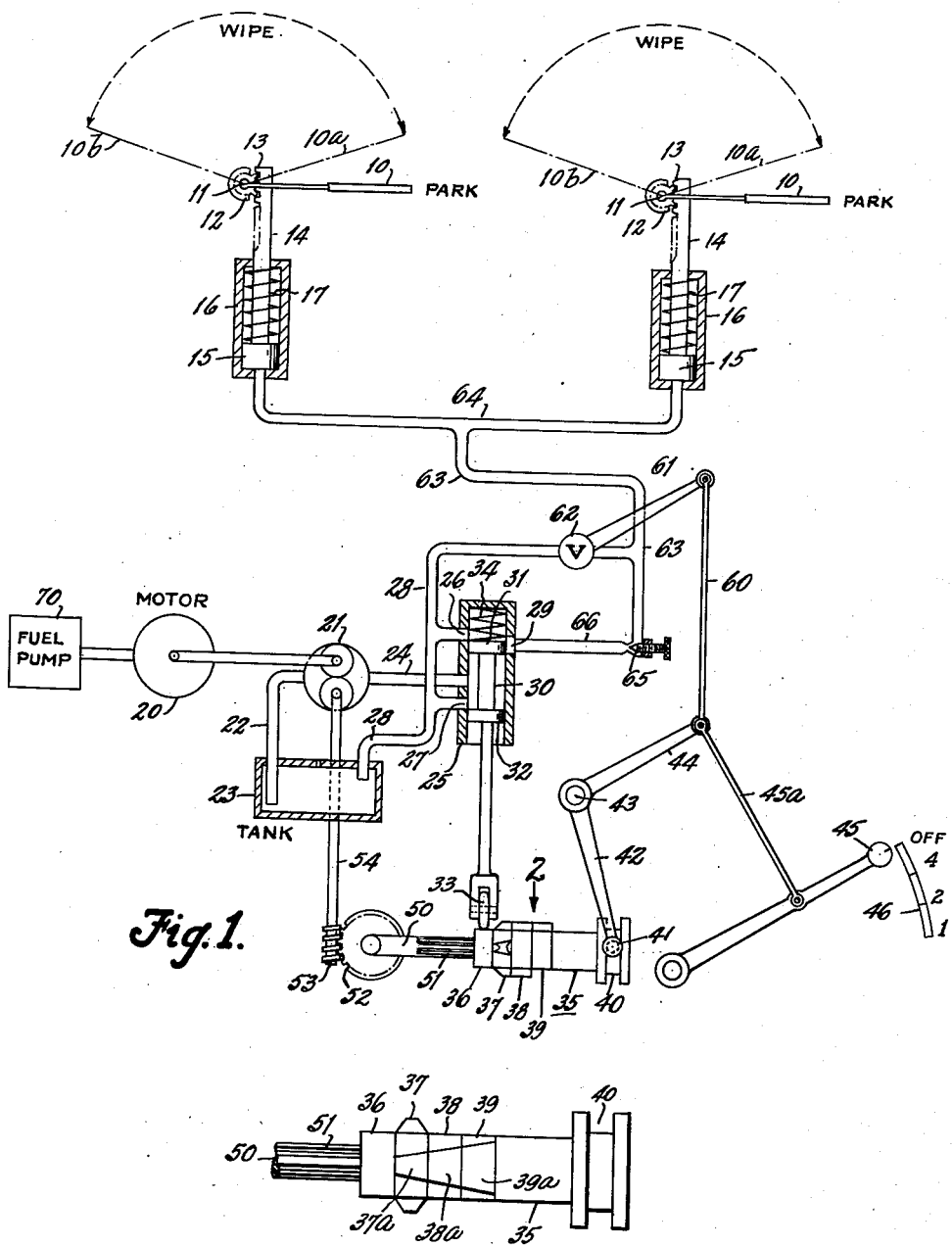
Fig. 1 is a diagram of an hydraulically operated windshield wiper embodying the present invention.
Fig. 2 is a fragmentary view in the direction of arrow 2 of Fig. 1, and is drawn to a larger scale.

Referring to Fig. 1, blades 10 are secured to rotatable shafts 11 to which gears 12 are also secured. The gears are driven by racks 13 formed on rods 14 attached to piston 15, slidable within cylinders 16 and urged downwardly by springs 17. The upward movement of pistons 15 is effected by fluid pressure as more fully described later, while the downward movement of the pistons is effected by the springs 17. This reciprocatory movement of the pistons 15 brings about the usual oscillatory movement of the wiper blades 10 within the operating range between positions 10a and 10b. When the wiper is not in use the blades are moved to the parked position, indicated on the drawing, by the springs 17, but this action is prevented during the normal wiping operation in a manner which will be described.

The mechanism for actuating the pistons 15 by fluid pressure includes an electric motor 20, which drives a gear pump 21 having an inlet pipe 22 receiving hydraulic fluid from a tank 23 and having an outlet pipe 24 connected with the interior of a valve guide 25 provided with ports 26 and 27 connected with a pipe 28 for carrying hydraulic fluid back to the tank 23. The guide 25 has a port 29 which is wider than the ports 26 and 27. A valve 30 having lands 31 and 32 is slidable within the valve guide and carries a roller 33 which a spring 34 urges into engagement with a sleeve 35 having a plain cylindrical section 36, a section 37 having four cam lobes, a section 38 having two cam lobes and section 39 having one cam lobe, and the sleeve is movable to different positions to bring any one of the several sections into cooperative relation with roller 33. To accomplish this, the sleeve 35 is provided with a grooved collar 40 with which pins 41 carried by forked lever 42 pivotally supported at 43 engage. The lever has an arm 44 connected by a link 45a (which may be a flexible cable) with a hand lever 45 which can be moved along a dial 46 bearing the indicia "Off, 4, 2, 1" and moves the sleeve 35 back and forth to its several positions.

The sleeve is supported by a shaft 50 having splines 51 on which the sleeve slides, but which connect the sleeve to the shaft for rotation therewith in any position of the sleeve as determined by the position of hand lever 45 relative to the dial 46. Shaft 50 is connected with a worm gear 52 driven by a worm 53 actuated by a shaft 54 connected with a gear shaft of the gear pump 21. Hence, the sleeve 35 in any of its positions is rotated by the motor 20 through the gear pump 21 and the gearing 53, 52 which represents diagrammatically any suitable speed reducing gearing.

A link 60 connects lever arm 44 with an arm connected with a rotary valve 62 for variably restricting the flow from a pipe 63 to the pipe 28. Pipe 63 is connected with pipe 64 connected with the cylinders 16. A needle valve 65 can be adjusted variably to restrict the flow from pipe 63 to a pipe 66 connected with port 29.

When the control handle 45 is in the "Off" position, sleeve 35 is located so that its cylindrical portion 36 contacts the roller 33 and the valve 62 is located so as to provide the least restriction to flow between pipes 63 and 28. The valve 30 remains in the position shown because the roller 33 rides on the cylindrical surface 36. Therefore, the pump outlet pipe 24 is connected with the tank 23 through the port 27 and the pipe 28. When the parts are in this position the spring 17 maintain the wiper blades 10 in parked position.

When the hand lever 45 is moved to position "4" on the dial 46, the sleeve section 37 will be located for engagement by the roller 33 and the valve 62 will be conditioned to provide a little more restriction between the pipes 63 and 28. For each revolution of shaft 50 there will be four upward movements of the valve 30 effected by the four cam lobes on the section 37. Each time the valve 30 is lifted, ports 26 and 27 are blocked and pipe 24 is connected with port 29. Hydraulic fluid under pressure will be forced through pipe 64 and will lift the pistons 15 to cause the blades to move as far as the positions 10b. The valve 30 returns to the position shown when the roller is between the cam lobes and at such time the pump outlet 24 is connected with tank 23 and pipes 64 and 63 are connected with pipe 28 by two parallel paths, one being provided by the valve 62 and the other path being the needle valve 65 the partially open port 29 and the port 26. Due to the restrictions provided by the valves 62 and 65, hydraulic fluid is discharged from the cylinder 16 as the pistons 15 are moved downwardly by springs 17 at a rate such that the blades can move only to the positions approximately represented by the line 10a before the valve 30 is lifted again by one of the cam lobes for the purpose of admitting pressure fluid to the cylinders to cause the blades to move toward position 10b.

When the hand lever 45 is moved to position "2" on dial 46, the sleeve section 38 having two lobes will be located in alignment with the roller 33 and the valve 62 will be moved into a position causing greater restriction to flow between pipes 63 and 28 than existed when the lever 45 was at position "4." This greater restriction is required because the time interval between the periods of contact of the two lobes of sleeve section 38 and the roller 33 is greater than the time interval between the periods of contact of the four lobes of sleeve section 37 with roller 33.

When the hand lever 45 is moved into position "1" on the dial 46, the single lobe section 39 of sleeve 35 will be moved into alignment with the roller 33 so that there will be one oscillation of valve 30 for each revolution of shaft 50; and valve 62 will be moved into a position causing still greater restriction to flow between the pipes 63 and 58. Still greater restriction is required because the time interval between the periods of engagement of the single lobe of sleeve section 39 with the roller 33 is greater than the time interval between successive periods of contact between the lobes of sleeve section 38 and roller 33. Valve 65 provides for an adjustment of the restriction of flow between pipes 63 and 66. Obviously, valve 65 might be omitted if pipe 66 were of exactly the proper size. By providing for restriction by valve 65 or by a pipe 66 of proper size, the valve 62 can be one which is fully open when the hand lever 45 is in the "Off" position and which is fully closed when the hand lever is in the position "1."

Movement of hand lever 45 from the "Off" position to position "4" causes the wiper to operate with the maximum frequency which is usually desirable in a very heavy rain or in order to make the windshield immediately clear for driving. Movement of lever 45 past the "4" position into the "2" or "1" positions causes the wiper blades to operate less frequently so that the speed of the wiper blades can be regulated as desired to give the best results under varying conditions. If desired, the cam lobes 37a, 38a and 39a of the sleeve sections 37, 38 and 39, respectively, may be made progressively wider as shown in Fig. 2, whereby the time intervals between oscillations of the blades are reduced. Therefore, less restriction in the back flow from the cylinder 16 can be relied on to prevent movement of the blades 10 clockwise appreciably beyond the positions 10a.

When the hand lever 45 is moved to the "Off" position, the blades 10 are immediately moved to the parked position by springs 17 because the valve 62 is fully open.

The parts 10 to 16 can be combined in two compact units which can be easily mounted in front of the windshield and connected by pipes 64 and 63 with a unit including the other parts of the apparatus. This unit could be mounted beneath the car floor. The hand lever 45 is located in a position convenient to the driver and is connected with lever 44 of the unit in any suitable manner as by the flexible cable 45a.

As shown diagrammatically, the same motor may be connected to drive a fuel pump 70 for supplying fuel to the engine. The pump 70 may be of any suitable construction, but the motor should have power sufficient to drive the two pumps 21 and 70 when operating a full load.

While the embodiment of the present invention as herein disclosed, constitutes a preferred form, it is to be understood that other forms might be adopted, all coming within the scope of the claims which follow.

What is claimed is as follows:

1. A windshield wiper having, in combination, a wiper blade movable over the surface of a windshield, a fluid servomotor for operating said blade, a fluid pressure pump for supplying fluid under pressure to the servomotor, a valve for controlling the flow of fluid from the pump to the servomotor, a motor for operating the pump and said valve, and means including a variable speed transmission operatively interconnecting said motor and said valve for controlling intermittent operation of said valve in order to control the speed of operation of the wiper blade.

2. A windshield wiper having, in combination, a wiper blade movable over the surface of a windshield, a fluid servomotor for operating said blade, a fluid pressure pump for supplying fluid under pressure to the servomotor, a motor for actuating said pump, a valve for intermittently establishing communication between the fluid pump and the servomotor, means through which the pump operates said valve, and means including a variable speed transmission for controlling the frequency of operation of said valve by said pump in order to control the speed of operation of the wiper blade.

3. A windshield wiper having, in combination, a wiper blade movable over the surface of a windshield, a fluid servomotor for operating said blade, a fluid pressure pump for supplying fluid under pressure to the servomotor, a motor for actuating said pump, a valve movable to one position to establish communication between the fluid pump and the servomotor to effect movement of said blade in one direction, resilient means for moving said motor and blade in the opposite direction when said valve is moved to another position to prevent actuation of the servomotor by said pump in order for said blade to be moved in the opposite direction, means for intermittently moving the valve to effect operation of the wiper blade, and means including a variable speed transmission for controlling the frequency of movement of said valve to its different positions in order to control the speed of operation of the wiper blade.

4. A windshield wiper having, in combination, a wiper blade movable over the surface of a windshield, a fluid servomotor for operating said blade, a fluid pressure pump for supplying fluid under pressure to the servomotor, a motor for actuating said pump, a valve movable to one position to establish communication between the fluid pump and the servomotor to effect movement of said blade in one direction, resilient means for moving said motor and blade in the opposite direction when said valve is moved to another position to prevent actuation of the servomotor by said pump in order for said blade to be moved in the opposite direction, means also operable by said motor for intermittently moving the valve to effect operation of the wiper blade, and manually operable means including a variable speed transmission for controlling the frequency of movement of said valve to its different positions, in order to control the speed of operation of the wiper blade.

5. A windshield wiper having, in combination, a wiper blade, a fluid servomotor having a piston operatively connected to actuate said blade, mechanism for moving the piston in opposite directions including a fluid pressure pump for supplying fluid under pressure to the servomotor to move the piston in one direction, a valve intermittently movable to two positions in one of which it establishes communication between the fluid pump and the servomotor to effect movement of the wiper blade in one direction, while in the other position it prevents the delivery of pressure fluid to the servomotor, resilient means associated with said piston for effecting movement of said piston and wiper blade in the opposite direction when said valve is in the other position, and means including a variable speed transmission for controlling the frequency of operation of said valve and the rate of movement of the servo piston in order to control the speed of operation of the wiper blade.

6. A windshield wiper having, in combination, a wiper blade, a fluid servomotor having a piston operatively connected to actuate said blade, mechanism for moving the piston in opposite directions including a fluid pressure pump for supplying fluid under pressure to the servomotor to move the piston in one direction, a valve intermittently movable to two positions in one of which it establishes communication between the fluid pump and the servomotor to effect movement of the wiper blade in one direction, while in the other position it prevents the delivery of pressure fluid to the servomotor, resilient means associated with said piston for effecting movement of said piston and wiper blade in the opposite direction when said valve is in the other position, means for controlling the frequency of operation of said valve, and a second separate means for controlling the rate of movement of the servo piston, whereby the speed of operation of the wiper blade may be regulated.

7. A windshield wiper having, in combination, a wiper blade, a fluid servomotor having a piston operatively connected to actuate said blade, mechanism for moving the piston in opposite directions including a fluid pressure pump for supplying fluid under pressure to the servomotor to move the piston in one direction, a valve intermittently movable to two positions in one of which it establishes communication between the fluid pump and the servomotor to effect movement of the wiper blade in one direction, while in the other position it prevents the delivery of pressure fluid to the servomotor, resilient means associated with said piston for effecting movement of said piston and wiper blade in the opposite direction when said valve is in the other position, means for controlling the frequency of operation of said valve, a second separate means for controlling the rate of movement of the servo piston, whereby the speed of operation of the wiper blade may be regulated, and a single member for operating both of said last named means.

8. A windshield wiper having, in combination, a wiper blade, a fluid servomotor having a piston operatively connected to actuate said blade, mechanism for moving the piston in opposite directions including a fluid pressure pump for supplying fluid under pressure to the servomotor to move the piston in one direction, a valve intermittently movable to two positions in one of which it establishes communication between the fluid pump and the servomotor to effect movement of the wiper blade in one direction, while in the other position it establishes connection between a drain and the pump and the servomotor, resilient means associated with said piston for effecting movement of said piston and wiper blade in the opposite direction when said valve is in the other position, means for controlling the frequency of operation of said valve, and a second adjustable valve for controlling the rate of fluid flow from the servomotor through said drain whereby the speed of operation of said wiper blade may be regulated.

9. A windshield wiper having, in combination, a wiper blade, a fluid servomotor having a piston operatively connected to actuate said blade, mechanism for moving the piston in opposite directions including a fluid pressure pump for supplying fluid under pressure to the servomotor to move the piston in one direction, a valve intermittently movable to two positions in one of which it establishes communication between the fluid pump and the servomotor to effect movement of the wiper blade in one direction, while in the other position it establishes connection between a drain and the pump and the servomotor, resilient means associated with said piston for effecting movement of said piston and wiper blade in the opposite direction when said valve is in the other position, means for controlling the frequency of operation of said valve, a second adjustable valve for controlling the rate of fluid flow from the servomotor through said drain, and a single means for actuating said controlling means and for adjusting the position of said second valve in order to regulate the speed of operation of the wiper blade.

10. A windshield wiper having, in combination, a wiper blade, a fluid servomotor having a piston operatively connected to actuate said blade, mechanism for moving the piston in opposite directions including a fluid pressure pump for supplying fluid under pressure to the servomotor to move the piston in one direction, a valve intermittently movable to two positions in one of which it establishes communication between the fluid pump and the servomotor to effect movement of the wiper blade in one direction, while in the other position it establishes connection between a drain and the pump and the servomotor, resilient means associated with said piston for effecting movement of said piston and wiper blade in the opposite direction when said valve is in the other position, means for controlling the frequency of operation of said valve, a second adjustable valve for controlling the rate of fluid flow from the servomotor through said drain, means for adjusting the position of said second valve in coordinated relation with the position of the means for controlling the frequency of operation of the first valve, a third valve adjustable independently of the second valve, and frequency controlling means for also controlling the rate of fluid flow from the servomotor through said drain.

11. A windshield wiper having, in combination, a wiper blade movable over the surface of a windshield, a fluid servomotor for operating said blade, a fluid pressure pump for supplying fluid under pressure to the servomotor, a motor for actuating said pump, a valve for intermittently establishing communication between the fluid pump and the servomotor, means for actuating said valve including a shaft operatively connected to said fluid pump and an operating member for said valve slidable on and rotatable with said shaft, said operating member being effective to actuate said valve at different frequencies as said member is moved to different positions on said shaft, and means for moving said member to different positions to control the frequency of operation of said valve in order to regulate the speed of operation of the wiper blade.

12. A windshield wiper having, in combination, a wiper blade movable over the surface of a windshield, a fluid servomotor for operating said blade, a fluid pressure pump for supplying fluid under pressure to the servomotor, a motor for actuating said pump, a valve for intermittently establishing communication between the fluid pump and the servomotor, means for actuating said valve including a shaft operatively connected to said fluid pump and an operating member for said valve slidable on and rotatable with said shaft, said operating member having formed thereon a plurality of axially spaced series of circumferentially spaced cams for intermittently operating said valve as the shaft is rotated, each series of cams being effective to operate the control valve at a different frequency and means for sliding said member on the operating shaft to bring any one of the several series of cams into operative relation with the valve.

13. A windshield wiper having, in combination, a wiper blade movable over the surface of a windshield, a fluid servomotor for operating said blade, a fluid pressure pump for supplying fluid under pressure to the servomotor, a motor for actuating said pump, a valve for intermittently establishing communication between the fluid pump and the servomotor, means for actuating said valve including a shaft operatively connected to said fluid pump and an operating member for said valve slidable on and rotatable with said shaft, said operating member having formed thereon a plurality of axially spaced series of circumferentially spaced cams for intermittently operating said valve as the shaft is rotated, each series of cams being different in number and in magnitude, and means for sliding said member on the operating shaft to bring any one of the series of cams into operative relation with said valve.

14. A windshield wiper having, in combination, a wiper blade movable over the surface of a windshield, a fluid servomotor for operating said blade, a fluid pressure pump for supplying fluid under pressure to the servomotor, a motor for actuating said pump, a valve for intermittently establishing communication between the fluid pump and the servomotor, means for actuating said valve including a shaft operatively connected to said fluid pump and an operating member for said valve slidable on and rotatable with said shaft, said operating member being effective to actuate said valve at different frequencies as said member is moved to different positions on said shaft, means for moving said member to different positions to control the frequency of operation of said valve in order to regulate the speed of operation of the wiper blade, and a second means adjustable concurrently with said slidable member, said second means being also effective to regulate the speed of operation of the wiper blade.

15. A windshield wiper having, in combination, a wiper blade movable over the surface of a windshield, fluid pressure actuated means operatively connected to said blade for effecting movement thereof, a source of fluid pressure for actuating said blade moving means, valve means in circuit connection between said pressure source and said blade moving means for controlling the flow of fluid therebetween, a motor operatively connected to said valve means for effecting movements thereof, and means in the connection between said valve means and said motor for varying the speed of operation of the wiper blade independent of the speed of said motor and while the motor is operating.

References Cited in the file of this patent

UNITED STATES PATENTS

| Number | Name | Date |
|---|---|---|
| 1,438,229 | Folberth | Dec. 12, 1922 |
| 2,368,291 | Dustan | Jan. 30, 1945 |
| 2,402,300 | Shimer | June 18, 1946 |
| 2,547,175 | Sacchini | Apr. 3, 1951 |